Nov. 24, 1953
N. H. YOUNG, JR
SIMULTANEOUS CONTROL SYSTEM FOR A PLURALITY OF PICTURE SIGNAL CHARACTERISTICS
Filed Feb. 25, 1950
2,660,613
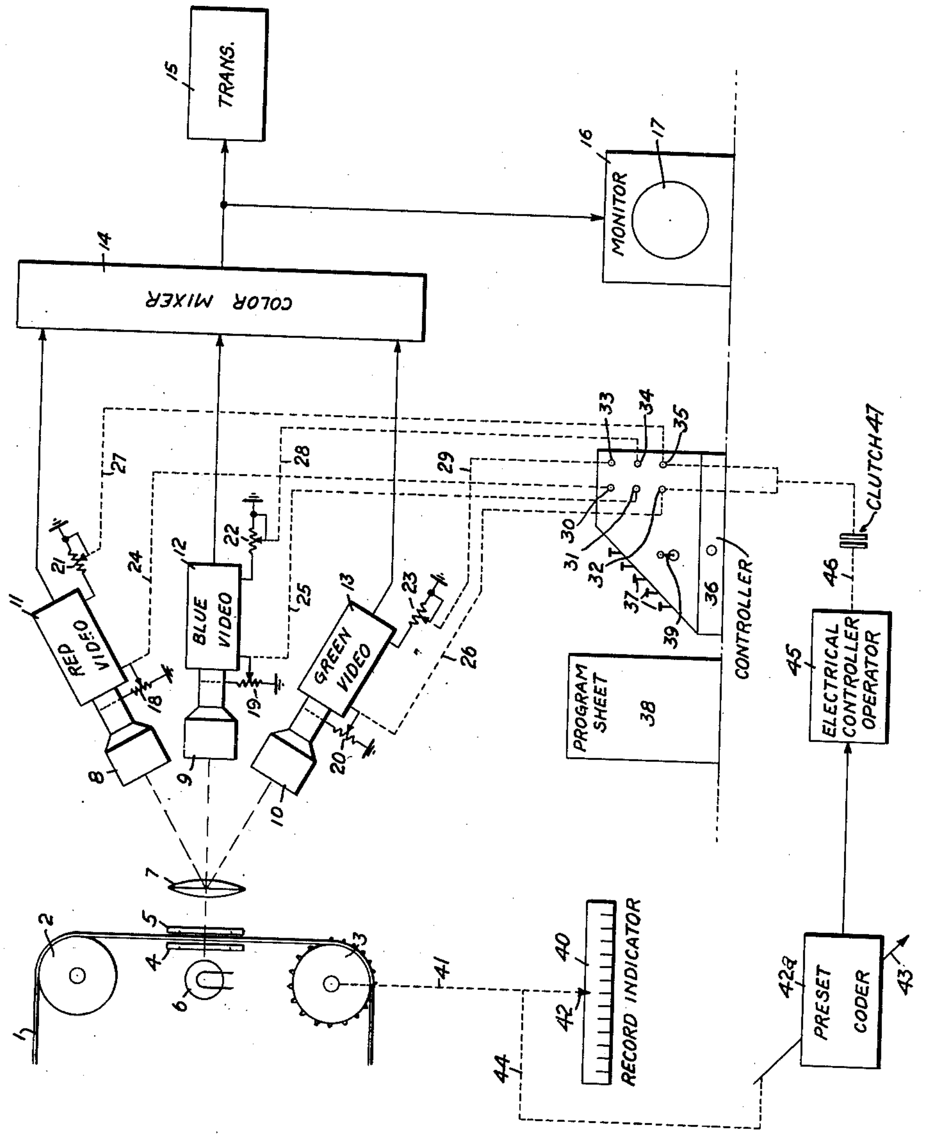
INVENTOR
NORMAN H. YOUNG, JR.
BY R. P. Morris
ATTORNEY Patented Nov. 24, 1953

2,660,613

UNITED STATES PATENT OFFICE 2,660,613

SIMULTANEOUS CONTROL SYSTEM FOR A PLURALITY OF PICTURE SIGNAL CHARACTERISTICS

Norman H. Young, Jr., Nutley, N. J., assignor to International Standard Electric Corporation, New York, N. Y., a corporation of Delaware Application February 25, 1950, Serial No. 146,290

4 Claims. (Cl. 178—5.4)

This invention relates to a system for controlling simulataneously a plurality of different image signal characteristics of an image producing device.

In image or picture transmission systems such as color television, for example, the measuring and correcting of electrical image signals requires the adjustment of a plurality of different controls including the gain or brightness of each of the red, green and blue signals and other characteristics thereof. When there is a considerable change in the color of the scene or scene illumination, adjustment may be required of all of these controls in order that the final picture have the desired characteristics. Manual re-adjustment of all of these multiple controls is so slow as to create annoying effects in the picture as reproduced. For example, the uncorrected scene is first seen then it is noticeably altered over a period of time as the correction is applied.

It is an object of this invention to provide an arrangement for setting any of a number of controls of an image signal system, substantially simultaneously to control the individually separate characteristics of the signals.

In accordance with a feature of my invention I provide for an image producing device having a plurality of means for controlling individually separate charcteristics of the image signals, a control storage means which may for example be a mechanical device similar to a calculator machine. The storage device has individual elements which may be adjusted for variable positions in accordance with a predetermined code. These individual adjustments may be conditioned for position in advance by operation of a set of keys or by a control mechanism associated with image projection arrangement and then may be operated simultaneously or in rapid succession so as to adjust the signal characteristics of the various image elements, as for example by potentiometers coupled to the mechanism of the signal storage device.

In presenting a color picture, for example from film, the film may first be viewed so that the various scenes are classified as to color brillance or contrast in accordance with the light characteristics of the projected image. A program sheet or a preset coder may then be prepared or adjusted to indicate by a predetermined code or by a combination of coding connections the proper characteristic adjustment for each of the various scenes. The film may then be arranged for projection onto a color television transmitter. In the manual system the operator may then view the image on a monitoring reproducer. The keys of some control device, as for example a calculator, may be depressed in advance awaiting the arrival of the next scene. If a calculator is used the code will be in the form of a number associated with different digits of the machine and will be set up by the operator pressing the desired keys. When the operator views on the monitor a change of scene which has previously been recorded on his program sheet he may then condition his storage device to operate, positioning the shafts or separate gears of the digits to the new position. Separate potentiometers coupled to the various controls and to the shafts will then be substantially simultaneously adjusted to present the new conditions for this change in scene.

The system may be made substantially automatic by pre-setting a coder associated with a record indicator indicating the length of film run off. This coder may be re-set for various adjustment steps dependent upon length of film corresponding to differently lighted scenes and a mechanical control coupled with the projection equipment adjusted to operate the coder to pre-set position. This coder may in turn operate some electrical control apparatus to turn the potentiometer shafts to the position corresponding to the pre-set code.

Alternatively, instead of requiring the watching of the monitoring controller, the program sheet may be associated with a record indicator showing the length of the record film which has been already projected so that the operator can control his manual equipment on the basis of this record indicator alone instead of using the monitor controller.

The above-mentioned and other features and objects of this invention and the manner of attaining them will become more apparent and the invention itself will be best understood by reference to the following description of an embodiment of the invention taken in conjunction with the accompanying drawings, in which:

The single figure illustrates in block schematic form the system incorporating the features of my invention.

Turning to the drawing, a picture record 1, which may for example be for color film, is shown guided in the projection position by a control spool 2 and a driving reel 3. The film 1 may pass between two positioning plates 4 and 5 having apertures through which light from a source 6 passes. This light may be focussed by some optical means generally illustrated at 7 so as to focus the image from the film on three television pick-up tubes or "Iconoscopes" 8, 9 and 10 corresponding to the red, blue and green signals of the constant color television. Output from pick-up tubes 8, 9 and 10 is applied to the separate video amplifier circuits 11, 12 and 13 respectively, and hence to the color mixer 14 and to a transmitter 15. Coupled to the output of color mixer 14 may be a monitoring device 16 which serves to reproduce a picture on the screen 17 corresponding to that being transmitted.

Individual potentiometers 18, 19 and 20 are shown coupled to the grids of tubes 8, 9 and 10 for individually controlling the brightness of the picked up images for the separate video circuits 11, 12 and 13. Other potentiometers 21, 22 and 23 are shown for controlling the gain of the video amplifier circuits 11, 12 and 13 respectively. Potentiometers 18–23 may be coupled over separate control shafts 24, 25, 26, 27, 28 and 29 respectively to corresponding rotatable shafts 30–35 respectively of the signal storage and controlling device 36. This device may be similar in construction to a calculator of known form in which the various controls for adjusting the individual shafts 30–35 may be conditioned by operation of keys 37 to set up any desired combination. The combination to be set up may be previously provided on a program sheet 38. The operator looking at the program sheet 38 will depress the desired ones of keys 37 corresponding to the next succeeding scene. He will continue to follow his monitoring screen and when a change in scene occurs will operate the control lever 39 on device 36 to cause the shafts to rotate to their corresponding desired positions. These shafts in turn will adjust the potentiometers 18–23 to their proper positions for the image in this following scene. This procedure may be repeated for the next succeeding scenes until the entire picture has been presented.

Instead of utilizing this monitoring device the program sheet 38 may be marked to correspond with particular calibration indications on a record indicator 40. This record indicator 40 is coupled by means of a shaft 41 to the film drive mechanism 3 so that the pointer 42 will show on the calibrated scale of indicator 40 a particular position of the film. The operator may then simply by watching this record indicator and the movement of pointer 42 thereover depress the desired keys to shift the scene in the same manner as if he were following the picture on the monitor.

In order that the manual operation of the operator may be dispensed with a preset coder 42*a* may be provided. This coder is adjustable, as indicated by arrow 43, in steps to set up different combinations of coding embodiments. Many types of code storage devices have been known for so many years that no particular illustration is needed for an understanding of the invention. It is clear that this preset coder may be made in any desired form, for example, a punched tape coder, so that code combinations may be set up to be operated for various lengths of film projected. The coder 42*a* is mechanical coupled with shaft 41 by means of a further shaft 44 so that the adjustment of this preset coder is automatically effected by this shaft. The output of coder 42*a* may be applied to an electrical controller-operator 45 which serves through the medium of shaft 46 and a clutch mechanism 47 to adjust the individual shafts 30, 31 to the desired positions. This mechanism may be of any known type, for example, similar to a type wheel printing mechanism which positions the shaft in accordance with a predetermined received code signal. Thus as the picture is progressively applied to the television transmitter the potentiometers 18—23 will be progressively adjusted in accordance with the changes indicated in preset coder 42*a*. In this case device 36 may be eliminated and the controller operator 45 may be constructed directly to control potentiometer adjusting shafts 24–29.

While the invention has been described with the storage and control device 36 as being of construction similar to a known form of calculator, it is clear that the only necessity is the rotation of a plurality of different shafts in accordance with different indications. It is, therefore, seen that the device 36 may be a much simpler mechanism that the calculator as it is necessary only to adjust individual shafts and not to perform any addition or subtraction, or any other mechanical calculation. Furthermore, while the invention has been shown as applied to a color television transmitter operating on film, it will be understood by those skilled in the art that the principles of the invention may be readily applied to various types of control apparatus where it is necessary to adjust a plurality of different control elements at predetermined intervals. The rapid adjustment of the controls in order not to disturb the output by a mechanism of this type is one of the principle virtues of the invention.

While I have described above the principles of my invention in connection with particular apparatus it will be understood that such specific description is to be regarded as illustrative of the invention only and not as a limitation of the scope of the invention as set forth in the objects thereof and the accompanying claims.

What I claim is:

1. A system for control of the different color components of a picture image signal producing television camera system, comprising separate camera devices forming an image signal producing device, a plurality of adjustable potentiometers individual to each of said camera devices for controlling individually picture signal intensity and contrast amplitude levels of each of the image signal components in said system, control storage means having individual variably positioned control elements coupled respectively to said adjustable means, means for setting up in said control storage means position adjustment information for said control elements predetermined in accordance with the light and color values of the image to be produced, and means for operating said control storage means to adjust said plurality of adjustable means substantially simultaneously into a position corresponding with the information stored in said control storage means.

2. A system according to claim 1 wherein a monitoring device is provided for said image producing device, and further comprising manually controllable operating means to operate said means for setting up.

3. A system according to claim 2, further comprising film projector means for providing pictures to said television camera system, including continuously operating film moving apparatus, said monitoring device comprising a record indicator operating under control of said film moving apparatus to indicate the portion of the film being projected.

4. A system according to claim 3, further comprising an adjustable preset coder device controlled to adjusted coding conditions under control of said record indicator, and means for applying output from said coder device to operate said means for setting up.

NORMAN H. YOUNG, Jr.

References Cited in the file of this patent

UNITED STATES PATENTS

| Number | Name | Date |
|---|---|---|
| 2,320,524 | Kreuzer | June 1, 1943 |
| 2,389,039 | Goldsmith | Nov. 13, 1945 |
| 2,405,246 | Watson | Aug. 6, 1946 |
| 2,406,760 | Goldmark | Sept. 3, 1946 |
| 2,413,075 | Schade | Dec. 24, 1946 |
| 2,434,561 | Hardy et al. | Jan. 13, 1948 |
| 2,458,649 | Schade | Jan. 11, 1949 |
| 2,543,772 | Goldmark | Mar. 6, 1951 |